UNITED STATES PATENT OFFICE.

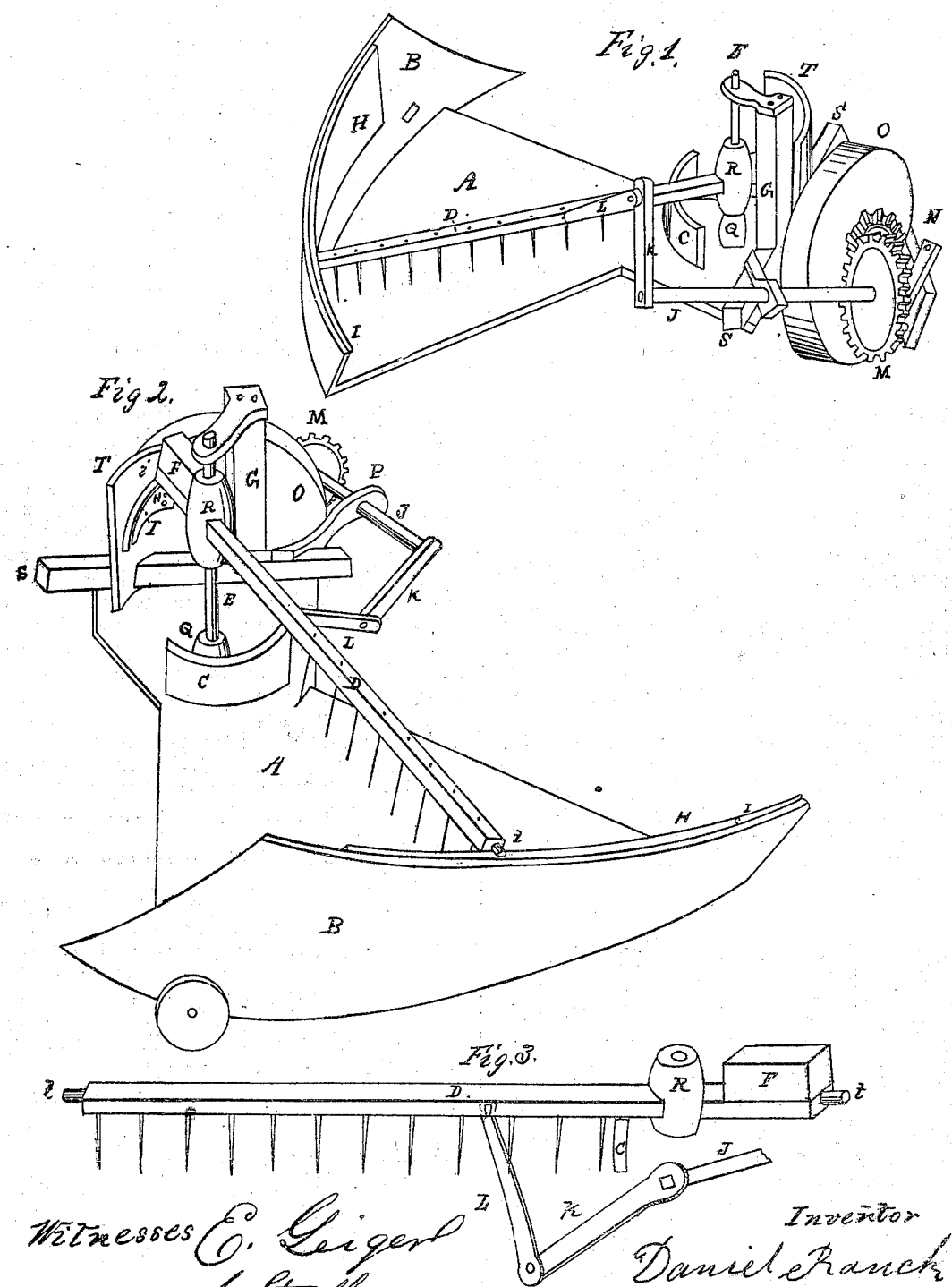

DANIEL RANCK, OF INTERCOURSE, PENNSYLVANIA.

IMPROVEMENT IN HARVESTERS.

Specification forming part of Letters Patent No. 23,115, dated March 1, 1859.

*To all whom it may concern:*

Be it known that I, DANIEL RANCK, of Intercourse, in the county of Lancaster and State of Pennsylvania, have invented a new and useful Improvement in the Raking Attachment to Reaping-Machines; and I do hereby declare that the following is a full, clear, and exact description of the construction and operation of the same, reference being had to the annexed drawings, making a part of this specification, in which—

Figures 1 and 2 are descriptive views; Fig. 3, the rake and its several parts, more fully set forth and described as follows:

The front or sickle side of the platform A is at a right angle to or with the driving-wheel O, having a side projection for the curved support C, upright T, and post G, with its projecting arm for the reception of the spindle or pivot E. The sliding head R of the rake D, Fig. 3, is slipped over the said pivot E, as its common center and axis of motion, the outer edge and rim B on the platform and the upright T being arcs of a large and smaller circle, of which the rake D and its loaded short end F are the several radii from its pivot E. The upper edge of the rim B corresponds with the side piece, H, forming an inclined plane, gradually rising forward to a point over the sickles, from whence it tapers into the projecting shoe. The side piece, H, terminates perpendicularly to the bed of the platform on its forward edge, while a reversed inclined plane adapted to the short end F of the rake is affixed to the inside of the curved upright T, ending in like manner toward the rear, having each a spring, I I, over which the ends *t t* of the rake are pressed, lodged on, and carried over their respective planes to their several termini, over which they simultaneously drop onto the platform. The head R is now lodged on the base Q of the pivot E, and the rake kept from coming in direct contact with the platform by the side support, C, and prevented from being pressed upward by its end *t* coming under the lower edge of the side piece, H, which is parallel to the bed of the platform, over which the rake is drawn back by the connecting-rod L, crank K, spindle J, and cog-wheels M and N, put in motion by the driving-wheel O, effectually raking the same, and dislodging its contents over the hind edge, when the rake is again pressed upward by the connecting-rod and crank and the ends *t* pass over the springs I on the inclined planes to repeat the operation.

What I claim as my invention, and desire to secure by Letters Patent, is—

The combination of the inclined planes H and springs I, crank K, and connecting-rod L, spindle or pivot E, sliding rake-head R, and curved supports B, T, and C, when these several parts are arranged in the manner described, for the purpose specified.

DANIEL RANCK.

Witnesses:
JACOB STAUFFER,
ZURIEL SWOPE.